US009232527B2

(12) United States Patent
Sonnenberg et al.

(10) Patent No.: US 9,232,527 B2
(45) Date of Patent: Jan. 5, 2016

(54) CROSS-LAYER, CROSS-NODE COGNITIVE NETWORK ENHANCED DYNAMIC SPECTRUM ALLOCATION

(71) Applicant: HARRIS CORPORATION, Melbourne, FL (US)

(72) Inventors: Jerome Sonnenberg, Melbourne, FL (US); David B. Chester, Palm Bay, FL (US); Bryan C. Hehn, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 54 days.

(21) Appl. No.: 14/105,870

(22) Filed: Dec. 13, 2013

(65) Prior Publication Data

US 2015/0173085 A1    Jun. 18, 2015

(51) Int. Cl.
| | | |
|---|---|---|
| *H04B 7/01* | (2006.01) |
| *H04W 72/08* | (2009.01) |
| *H04W 16/14* | (2009.01) |
| *H04W 72/04* | (2009.01) |

(52) U.S. Cl.
CPC ............ *H04W 72/082* (2013.01); *H04W 16/14* (2013.01); *H04W 72/0446* (2013.01)

(58) Field of Classification Search
CPC .... H04L 5/0096; H04W 16/14; H04W 16/22; H04W 72/04; H04W 72/0486; H04W 72/082
USPC ........ 455/501, 509, 446, 574, 450, 67.11, 68; 370/343, 338, 278, 204, 347, 329, 337, 370/249, 503; 701/216, 213
See application file for complete search history.

(56) References Cited

U.S. PATENT DOCUMENTS

| 7,974,402 | B2 * | 7/2011 | Pun ............................... 379/350 |
| 8,160,163 | B1 | 4/2012 | Yucek et al. |
| 8,666,421 | B2 * | 3/2014 | Xu et al. ...................... 455/446 |

(Continued)

OTHER PUBLICATIONS

Canbert, Berk and Oktug, Sema, Xpec: A Cross-Layer Spectrum Assignment in Cognitive Radio Networks, 2010 IEEE 4th International Syposium on Advanced Networks and Telecommuication Systems, pp. 67-69.

(Continued)

*Primary Examiner* — Tan H Trinh
(74) *Attorney, Agent, or Firm* — Robert J. Sacco; Carol E. Thorstad-Forsyth; Fox Rothschild LLP

(57) ABSTRACT

Systems (100) and methods (700) for dynamically managing Secondary User Node ("SUN") access to a segment of a wireless spectrum licensed for use by Primary User Nodes ("PUNs"). The methods comprise: detecting physical data transfers by PUNs (110-122) at first licensed frequencies ($f_1$, $f_2$, $f_3$, $f_4$) during slot sample times of a first epoch (t1-t15); generating a report comprising sensed spectral data indicating (a) during which of the slot sample times each physical data transfer was detected by a respective SUN (102-108) and (b) at which of the first licensed frequencies each physical data transfer occurred; receiving a report broadcasted from a remote SUN at a non-licensed frequency during a respective slot report times (t16-t19) of the first epoch; and analyzing the sensed spectral data of the reports to determine a time for using a first licensed frequency without interfering with or only minimally interfering with use thereof by PUNs.

18 Claims, 7 Drawing Sheets

(56) References Cited

U.S. PATENT DOCUMENTS

| | | | |
|---|---|---|---|
| 8,885,630 B2* | 11/2014 | Pun et al. | 370/347 |
| 2006/0083205 A1* | 4/2006 | Buddhikot et al. | 370/338 |
| 2006/0100781 A1* | 5/2006 | Lin et al. | 701/216 |
| 2009/0170542 A1* | 7/2009 | Chen et al. | 455/501 |
| 2009/0186609 A1* | 7/2009 | Wu et al. | 455/424 |
| 2009/0247201 A1 | 10/2009 | Ye et al. | |
| 2009/0252102 A1 | 10/2009 | Seidel et al. | |
| 2010/0142509 A1* | 6/2010 | Zhu et al. | 370/343 |
| 2011/0090853 A1* | 4/2011 | Chandramouli et al. | 370/329 |
| 2011/0210889 A1* | 9/2011 | Dai et al. | 342/357.29 |
| 2011/0222493 A1 | 9/2011 | Mangold et al. | |
| 2012/0039284 A1* | 2/2012 | Barbieri et al. | 370/329 |
| 2012/0135779 A1 | 5/2012 | Kundargi et al. | |
| 2012/0231829 A1* | 9/2012 | Guo | 455/509 |
| 2012/0281637 A1* | 11/2012 | Junell | 370/329 |
| 2012/0281643 A1* | 11/2012 | Sun et al. | 370/329 |
| 2012/0289236 A1* | 11/2012 | Xu et al. | 455/446 |
| 2014/0094127 A1* | 4/2014 | Dimou et al. | 455/67.11 |

OTHER PUBLICATIONS

Ding, Lei et al., Cross-Layer Routing and Dynamic Spectrum Allocation in Cognitive Radio Ad Hoc Networks, IEEE Transactions on Vehicular Technology, vol. 59, No. 4, May 2010, pp. 1969-1979.

Facchini, Christian, et al., Identifying Relevant Cross-Layer Interactions in Cognitive Processes, IEEE Globecom 2010 (6 pages).

Foukalas, Fotis and Zervas, Evangelos, On Cross-Layer Design of AMC Based on Rate Compatible Punctured Turbo Codes, Int. J. Communications, Network and System Sciences, 2010, 3, 256-265.

Gogineni, Sandeep et al., A Cross Layer Routing Protocol for Cognitive Radio Networks using Channel Activity Tracking, Asilomar 2012, pp. 1079-1083.

Holland, Oliver et al., A Unviersal Resource Awreness Channel for Cognitive Radio, The 17th Annual IEEE International Symposium on Personal, Indoor and Mobile Radio Communications (PIMRC'06) (5 pages), (2006).

Jiang, Hong et al., Multi-objective optimization of cross-layer configuration for cognitivie wireless network, 2009 Eighth IEEE International Conference on Dependable, Autonomic and Secure Computing, pp. 379-383.

Peng, Yi et al., The Research of Cross-layer design between the PHY and MAC layer for OFDM-Based Cognitive Radio Network, 2009 International Confernce of Networks Security, Wireless Communications and Trusted Computing, pp. 290-293.

Saleh, Ghada et al., A Minimum-Delay Cross-Layer Transmission Policy for Cognitive Multi-Access Networks with Imperfect Sensing, Globecome 2012—Cognitive Radio and Networks Symposium, pp. 1332-1338, (2012).

Wang, Jingyao et al., A Novel Cross Layer Design Scheme Based on Principal Component Analysis in Cognitive Network, Pronceedings of A1A12010 (undated) (4 pages), (2010).

Yuan, Yuan et al., Allocating Dynamic Time-Spectrum Blocks for Cognitive Radio Networks, MobiHoc '07, Sep. 9-14, 2007 (11 pages).

Haykin, S., "Cognitive Radio: Brain-Empowered Wireless Communications," IEEE Journal on Selected Areas in Communications, IEEE Service Center, Piscataway, US, vol. 23, No. 2, Feb. 1, 2005, pp. 201-220, XP011126474, ISSN: 0733-8716, DOI: 10.1108/JSAC.2004.839380.

European Search Report for EP 14 00 4180 dated Jun. 2, 2015.

* cited by examiner

| Time | | t1 | t2 | t3 | t4 | t5 | t6 | t7 | t8 | t9 | t10 | t11 | t12 | t13 | t14 | t15 | t16 | t17 | t18 | t19 |
|---|---|---|---|---|---|---|---|---|---|---|---|---|---|---|---|---|---|---|---|---|
| Node | | \multicolumn{15}{c}{Frequency Detected By Secondary User Nodes at Timeslot N} | \multicolumn{4}{c}{Report Times} |
| 102 | | 1 | 2 | 1 | 3 | 2 | 1 | 4 | 2 | 1 | 2 | 1 | 2 | 3 | 1 | 4 | | | | |
| 104 | | 1 | 2 | 1 | 2 | 3 | 1 | 4 | 2 | 1 | 2 | 1 | 2 | 3 | 1 | 4 | | | | |
| 106 | | 1 | 1 | 1 | 2 | 3 | 1 | 4 | 2 | 1 | 2 | 1 | 2 | 3 | 1 | 4 | | | | |
| 108 | | | | | | | | | | | | | | | | | | | | |

FIG. 4

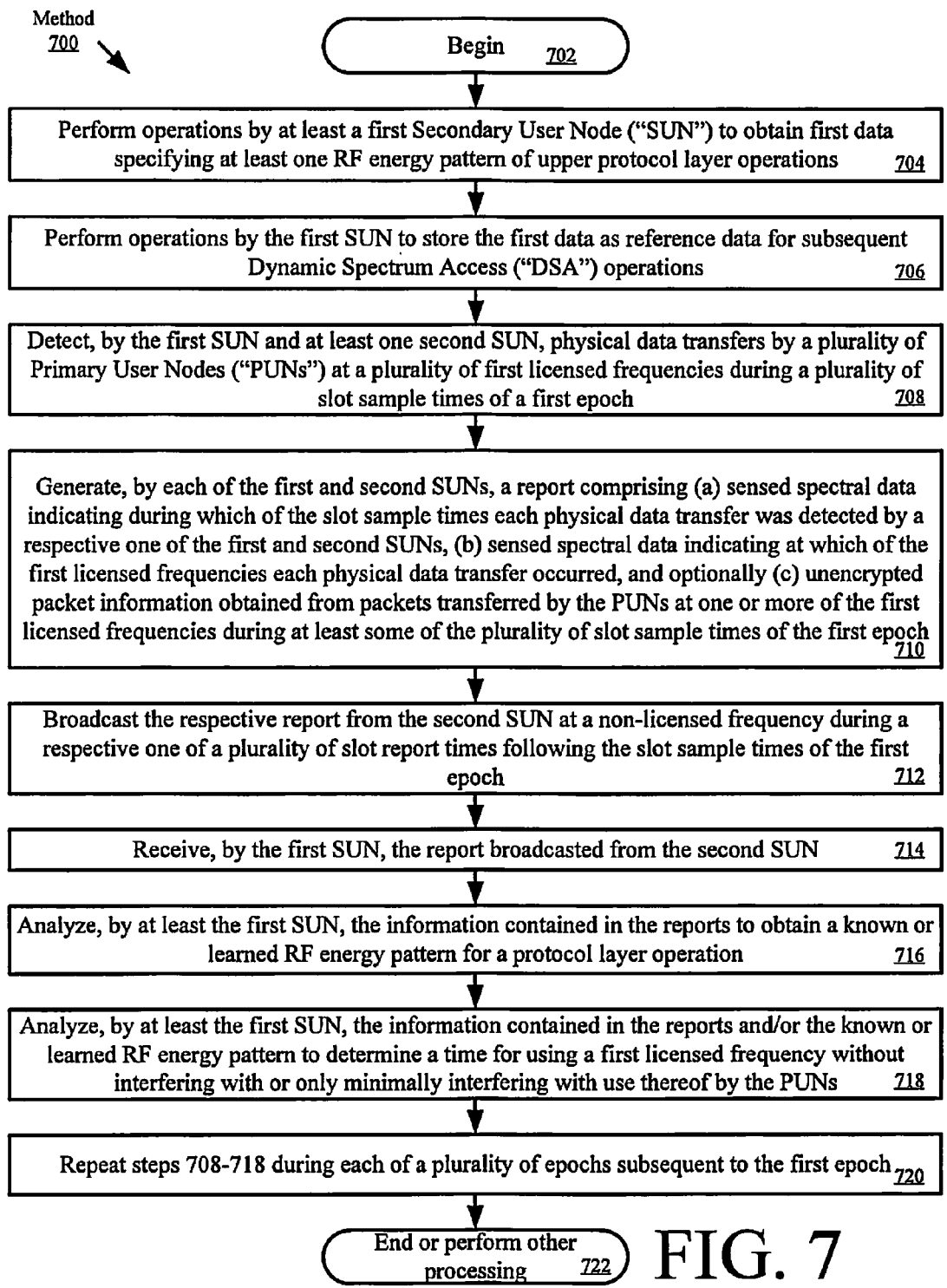

CROSS-LAYER, CROSS-NODE COGNITIVE NETWORK ENHANCED DYNAMIC SPECTRUM ALLOCATION

BACKGROUND OF THE INVENTION

1. Statement of the Technical Field

The inventive arrangements relate to communication networks. More particularly, the present invention relates to systems and methods for Dynamic Spectrum Access ("DSA") or Dynamic Spectrum Management ("DSM") within the communication networks (e.g., a cognitive network).

2. Description of the Related Art

In current practice, the Federal Communications Commission ("FCC") licenses segments of a Radio Frequency ("RF") energy spectrum (or wireless spectrum) to users in particular geographic areas. The licensed segments of the wireless spectrum include a Very High Frequency ("VHF") band segment and an Ultra-High Frequency ("UHF") band segment. In this regard, the wireless radio nodes of said users each utilize a fixed or preset segment of the wireless spectrum for RF communication purposes. These wireless radio nodes are referred to herein as Primary User Nodes ("PUNs"). Wireless radio nodes which are not permitted by such licensing to use one or more segments of the wireless spectrum are referred to herein as Secondary User Nodes ("SUNs").

Studies have shown that 98% of the wireless spectrum is allocated in terms of licensing. The unallocated 2% of the wireless spectrum is left open for anyone to use as long as they follow certain power regulations. For example, the unallocated 2% of the wireless spectrum is used by Local Area Networks ("LAN") and Bluetooth networks. Accordingly, the unallocated 2% of the wireless spectrum can be used by both the PUNs and the SUNs if they are suitably network enabled.

With the increased demand for personal wireless technologies, the unallocated portion of the wireless spectrum has become crowded. Consequently, various efforts have been made to address the overcrowding issue. One solution involves allowing SUNs to use licensed segments of the wireless spectrum, provided that any interference with the PUNs is minimal. Even though 98% of the wireless spectrum is licensed, only about 11% of the licensed portion of the wireless spectrum is actually utilized by the PUNs. Therefore, it is very possible that the SUNs' utilization of the licensed portion of the wireless spectrum results in minimal interference with PUN communications.

In view of the forgoing, efforts have been made in the field to configure SUNs for facilitating DSA/DSM (i.e., the management of licensed spectrum resources). In this regard, the SUNs are generally operative to sense licensed segments of the wireless spectrum. When a licensed segment of the wireless spectrum is sensed, the SUNs access and use that portion of the wireless spectrum as secondary users until communication activity by one or more PUNs therein is detected. Despite the advantages of this conventional DSA/DSM technique, it suffers from certain drawbacks. For example, collisions can frequently occur between PUN communications and SUN communications as a SUN finds a spectrum "hole" or spectrum "white space" (i.e., unused portion of a licensed wireless spectrum segment) and coordinates with its peer SUNs to use the spectrum "hole" or "whitespace".

Typically, the PUNs and SUNs employ an Open Systems Interconnection ("OSI") protocol stack. The OSI protocol stack generally comprises the following seven layers: (1) physical layer; (2) data link layer; (3) network layer; (4) transport layer; (5) session layer; (6) presentation layer; and (7) application layer. Each of these layers is well known in the art, and therefore will not be described in detail herein. In the cognitive network scenarios, the cognitive SUNs are each designed to include cognition or knowledge at just the physical layer of the OSI protocol stack for spectrum analysis purposes. In this regard, the SUNs implement a number of conventional physical layer spectrum sensing approaches to signal detection and/or various conventional rendezvous approaches for groups of SUNs to agree on the wireless spectrum to "borrow". Despite the advantages of these conventional cognitive network approaches, they provide limited gains to solving the DSA/DSM problem.

SUMMARY OF THE INVENTION

Embodiments of the present invention concern systems and methods for dynamically managing Secondary User Node ("SUN") access to a segment of a wireless spectrum licensed for use by Primary User Nodes ("PUNs"). The methods comprise detecting, by first and second SUNs, physical data transfers by the PUNs at a plurality of first licensed frequencies during a plurality of slot sample times of a first epoch. Each of the first and second SUNs then generates a report comprising sensed spectral data indicating (a) during which of the slot sample times each physical data transfer was detected by a respective one of the first and second SUNs, and (b) at which of the first licensed frequencies each physical data transfer occurred. Thereafter, the second SUN broadcasts its report at a non-licensed frequency during a respective one of a plurality of slot report times following the slot sample times of the first epoch. The broadcasted report is received by the first SUN. At the first SUN, the sensed spectral data from its report and the broadcasted report are analyzed to determine a time for using a first licensed frequency without interfering with or only minimally interfering with use thereof by the PUNs. Thereafter, the above method steps are repeated during each of a plurality of epochs subsequent to the first epoch.

In unencrypted data scenarios, the report generated by at least one of the first and second SUNs further comprises unencrypted packet information transferred by the PUNs at at least one of the first licensed frequencies during at least some of the plurality of slot sample times of the first epoch. During the above analysis step, protocol header information is extracted by the first SUN from the unencrypted packet information. The protocol header information is then used by the first SUN to identify at least one protocol layer operation which is probably being performed by the PUNs. Next, the first SUN obtains a known or learned RF energy pattern for the protocol layer operation which was previously identified. The known or learned RF energy pattern is also analyzed by the first SUN for purposes of determining a time that it can use the first licensed frequency without interfering with or only minimally interfering with use thereof by the PUNs.

In the encrypted data scenarios, the first SUN determines a traffic RF energy pattern at a licensed frequency of the plurality of licensed frequencies. The traffic RF energy pattern is then compared to a plurality of known or learned RF energy patterns for various protocol layer operations. Subsequently, the first SUN used the known or learned RF energy pattern that entirely or at least partially matches the traffic RF energy pattern for purposes of determining a time that it can use the first licensed frequency without interfering with or only minimally interfering with use thereof by the PUNs.

BRIEF DESCRIPTION OF THE DRAWINGS

Embodiments will be described with reference to the following drawing figures, in which like numerals represent like items throughout the figures, and in which:

FIG. 4 is schematic illustration showing an exemplary epoch that is useful for understanding the present invention.

FIG. 7 is a flow diagram of an exemplary method for dynamically managing secondary user node access to a segment of a wireless spectrum licensed for use by primary user nodes.

DETAILED DESCRIPTION

Figure 1:
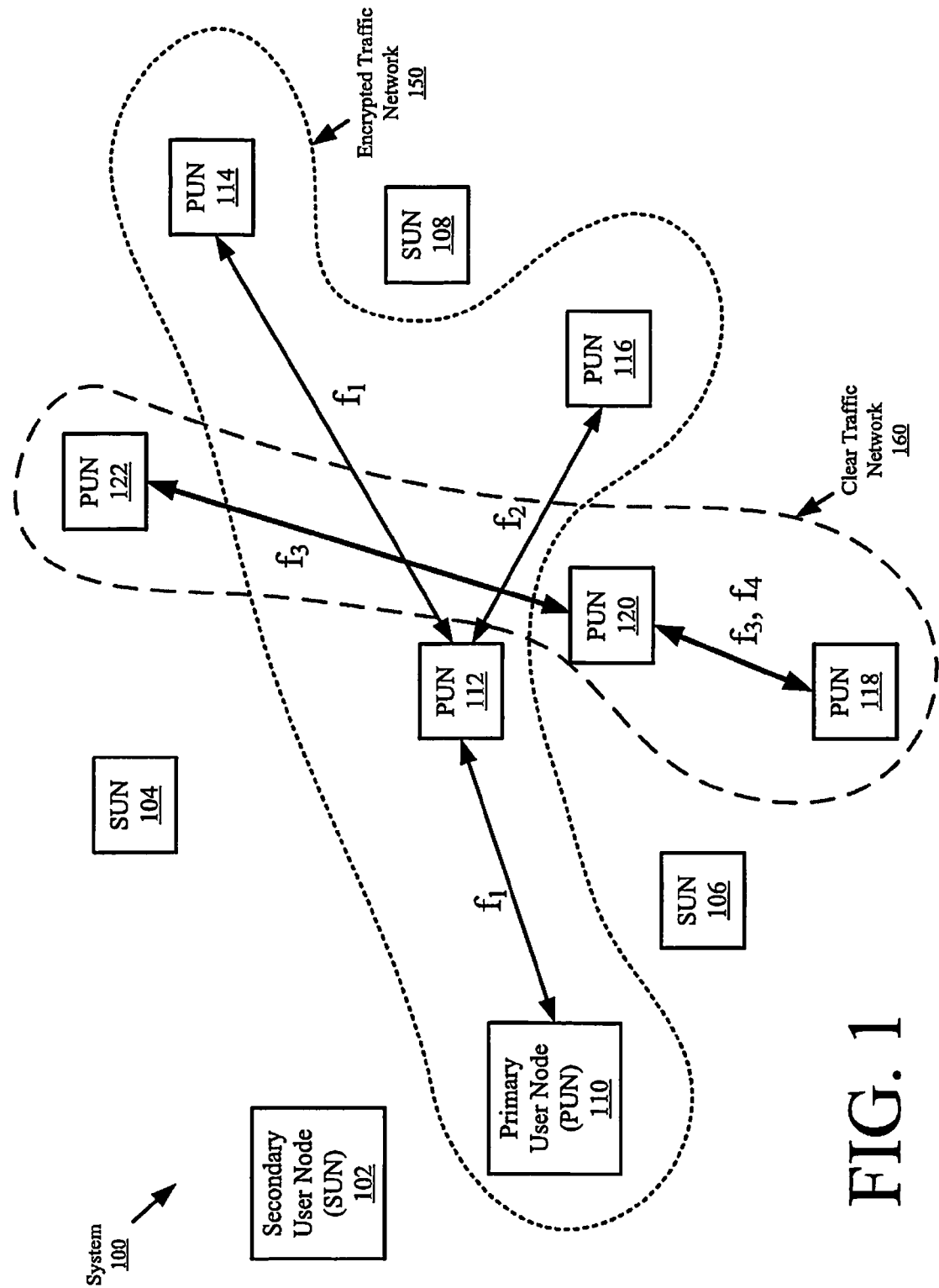
FIG. 1 is an example of a system that is useful for understanding the present invention.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

It should also be appreciated that the terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Further, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention generally concerns systems and methods for facilitating DSA/DSM in a communications network. The communications network comprises PUNs and SUNs. As noted above, the PUNs include wireless radio nodes which are permitted by certain licensing terms to use at least one particular fixed or preset wireless spectrum. The SUNs include wireless radio nodes which are not permitted by certain licensing terms to use the particular fixed or preset wireless spectrum(s), but are allowed by the FCC to use the wireless spectrum(s) in certain scenarios where interference with PUN communications is minimal. In this regard, the PUNs always have full access to a respective licensed segment of the wireless spectrum. In contrast, the SUNs only have partial access to the licensed segment of the wireless spectrum. The novel manner in which this partial access is dynamically managed will become evident as the discussion progresses.

Referring now to FIG. 1, there is shown a diagram of an exemplary system 100 that is useful for understanding the present invention. System 100 implements a novel method for dynamically managing SUN access to a segment of a wireless spectrum licensed for use by PUNs. This novel method will become more evident as the discussion progresses.

As shown in FIG. 1, system 100 comprises a plurality of wireless radio nodes 102-122. Wireless radio nodes 110-122 are PUNs, i.e. wireless radio nodes which are permitted by certain licensing terms to use at least one particular fixed or preset wireless spectrum. PUN architectures are well known in the art, and therefore will not be described herein. Wireless radio nodes 102-108 are SUNs, i.e. wireless radio nodes which are not permitted by certain licensing terms to use the particular fixed or preset wireless spectrum. Although the SUNs 102-108 lack such license-based permission, the SUNs are allowed to use the fixed or preset wireless spectrums for communicating during times in which interference with PUN communications is minimal. Exemplary SUN architectures will be described below in relation to FIG. 2.

In some scenarios, the system 100 comprises a cognitive system. As such, the wireless radio nodes 102-122 may comprise cognitive radios. A cognitive radio is generally an intelligent radio that can be programmed and configured dynamically. The transceiver of the cognitive radio is designed to use the best wireless channels in its vicinity. As such, the cognitive radio is operative to automatically detect available channels in a wireless spectrum and change its transceiver parameters accordingly. The transceiver parameters include, but are not limited to, a waveform parameter, a protocol parameter, an operating frequency parameter, and a networking parameter.

As shown in FIG. 1, the PUNs 110-122 are arranged into two networks 150, 160. More particularly, PUNs 110-114 comprise an Encrypted Traffic Network ("ETN") 150 in which frequencies $f_1$ and $f_2$ of a first licensed frequency band are used to communicate at least some information in an encrypted format. PUNs 118-122 comprise a Clear Traffic Network ("CTN") in which frequencies $f_3$ and $f_4$ of a second licensed frequency band is used to communicate all information in an un-encrypted or clear format. The first and second licensed frequency bands can be the same frequency bands or different frequency bands. Embodiments of the present invention are not limited to the particularities of the network architecture shown in FIG. 1.

During operation, the SUNs 102-108 perform various DSA/DMA operations. The DSA/DMA operations generally include spectrum sensing operations and spectrum management operations. The spectrum sensing operations involve detecting unused spectrum. The manner in which the unused spectrum is detected will be described in detail below. Still, it should be noted that the spectrum sensing operations generally involve: detecting physical data transfers by the PUNs within networks 150 and 160; and/or using sensed spectral data to determine when to allow SUNs access to a licensed spectrum.

In the unencrypted data scenarios, protocol header information is extracted from packets transmitted from the PUNs. The protocol header information is then used to identify (with a relatively high degree of certainty) a protocol layer operation which is probably being performed by the PUNs. Thereafter, a known RF energy pattern of the identified protocol layer operation (e.g., RF energy patterns of MAC layer link closure/release operations and/or IP layer network packet transfer operations) is used to determine when the SUNs should be allowed use of the licensed spectrum. In unencrypted scenarios, the protocol header information and knowledge of network protocols can be used to identify a RF energy pattern of an upper-layer operation (e.g., an Internet Protocol layer operation).

In contrast, in the encrypted data scenarios, an analysis of a signal length and a sensed RF energy pattern is performed for purposes of to identifying (with a relatively high degree of certainty) a protocol layer operation which is probably being performed by the PUNs. This identification is achieved by comparing the sensed RF energy pattern to each of a plurality of known or learned RF energy patterns of various upper-layer operations (e.g., an RF energy pattern of an IP layer network packet transfer operation). The known or learned RF energy pattern that matches the sensed RF energy pattern is then used as a guide to future transmissions by the SUN(s) 102-108. For example, an RF energy pattern for an upper-layer operation is used by the SUN 102-108 to identify when "holes" or "white spaces" (i.e., underutilized portions of a spectrum) occur in a spectrum which have no upper-layer users (and therefore can be used to communicate packet traffic to and/or from a SUN 102-108 without any or only a minimal amount of interference with the PUNs). The upper-layer operations can include, but are not limited to, operations of at least one protocol stack layer which resides above a physical layer.

The spectrum management operations involve coordinating knowledge of sensed traffic patterns with other SUNs 102-108. This coordination can be achieved using a relatively small amount of available bandwidth in a freely available spectrum (e.g., the ISM band of 900 MHz, 2.4 GHz, and/or 5.8 GHz). The coordinated traffic pattern knowledge creates a database of traffic usage in the system 100. In the cognitive network scenarios, each SUN's knowledge of traffic patterns can be known and/or learned thereby.

Figure 2:
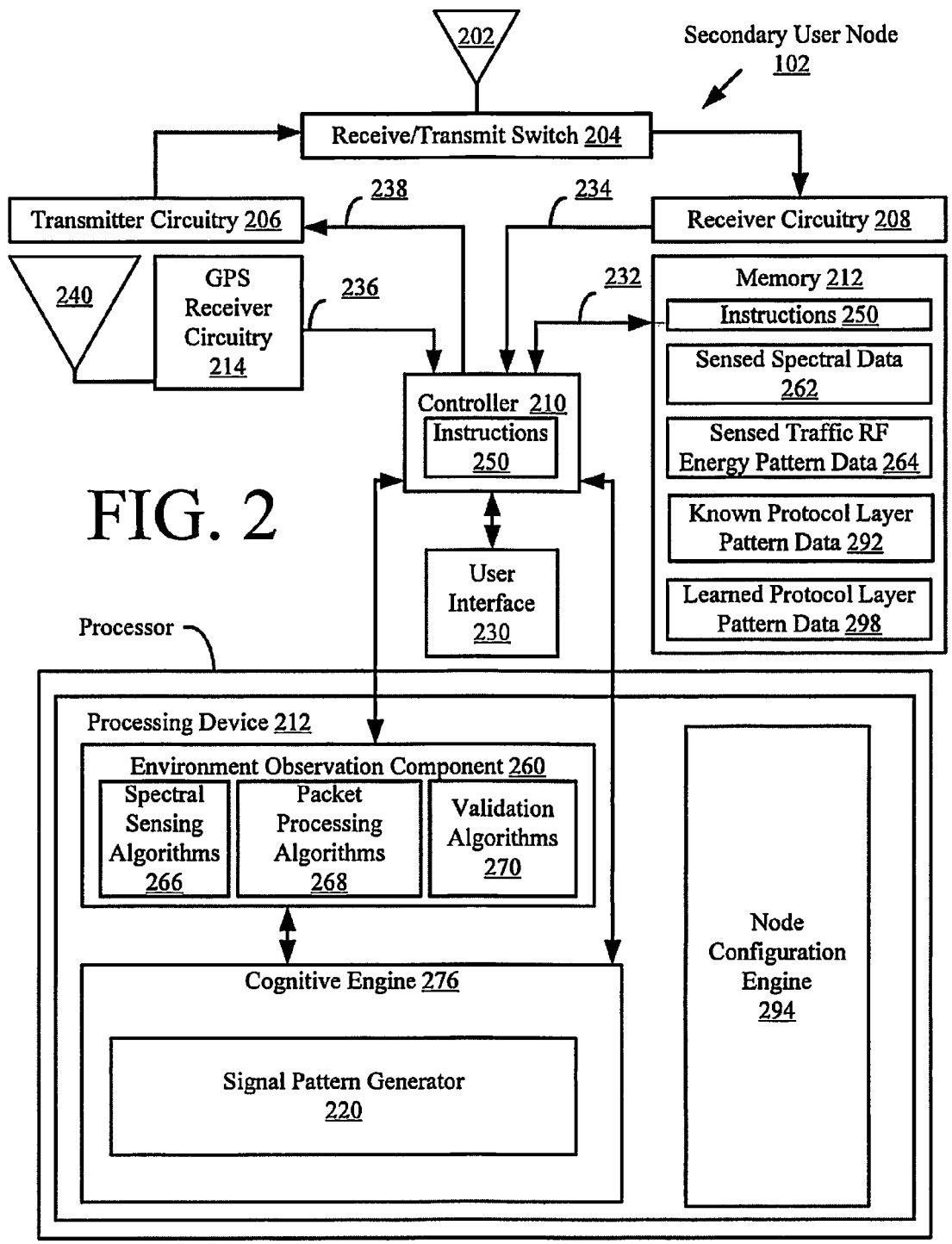
FIG. 2 is a node of the system shown in FIG. 1 that is useful for understanding the present invention.

Referring now to FIG. 2, there is provided a more detailed block diagram of an exemplary architecture for SUN 102 that is useful for understanding the present invention. The SUNs 104-108 are the same as or similar to SUN 102. As such, the following discussion of SUN 102 is sufficient for understanding SUNs 104-108. As should be understood, the SUNs 102-108 form a portion of the physical layer of the system network 100.

SUN 102 can include more or less components than that shown in FIG. 2. However, the architecture of SUN 102 shown in FIG. 2 is sufficient for facilitating DSA/DMA operations, as described above. In this regard, SUN 102 implements at least a portion of a method for providing DSA/DSM operations within the communication networks (e.g., a cognitive network). Exemplary embodiments of said method will be described below in relation to FIG. 7.

Notably, SUN 102 can implement a protocol stack including a plurality of protocol stack layers. For example, SUN 102 can implement an OSI protocol stack. OSI protocol stacks are well known in the art, and therefore will not be described in detail herein. Still, it should be noted that the OSI protocol stack includes the following seven layers: (1) physical layer; (2) data link layer; (3) network layer; (4) transport layer; (5) session layer; (6) presentation layer; and (7) application layer. Each of the listed layers is well known in the art, and therefore will not be described herein. As is also known in the art, packets generated in accordance with the OSI protocol stack include a header portion, a payload portion, and an optional trailer portion. The header portion comprises header information for each layer of the OSI protocol stack. For example, the header portion comprises a physical layer header, a data link layer header, a network layer header, a transport layer header, a session layer header, a presentation layer header, and an application layer header.

In some scenarios, SUN 102 comprises an SDR with a spectral sensing capability. SDRs are well known in the art, and therefore will not be described in detail herein. Still, it should be understood that the SDR is software configured in RF characteristics and software programmable in protocol stack layers.

As shown in FIG. 2, the SUN 102 comprises an antenna 202 for receiving and transmitting RF signals. A receive/transmit (Rx/Tx) switch 204 selectively couples the antenna 202 to the transmitter circuitry 206 and receiver circuitry 208 in a manner familiar to those skilled in the art. The receiver circuitry 208 demodulates and decodes the RF signals received from another network node (e.g., the network node 104-122 of FIG. 1) to derive information therefrom. The receiver circuitry 208 is coupled to a controller 210 via an electrical connection 234. The receiver circuitry 208 provides the decoded RF signal information to the controller 210. The controller 210 uses the decoded RF signal information in accordance with the function(s) of the SUN 102. The controller 210 also provides information to the transmitter circuitry 206 for encoding and modulating information into RF signals. Accordingly, the controller 210 is coupled to the transmitter circuitry 206 via an electrical connection 238. The transmitter circuitry 206 communicates the RF signals to the antenna 202 for transmission to an external device (e.g., network node 104-122 of FIG. 1).

An optional antenna 240 is coupled to an optional Global Positioning System ("GPS") receiver circuitry 214 for receiving GPS signals. The GPS receiver circuitry 214 demodulates and decodes the GPS signals to extract GPS location information therefrom. The GPS location information indicates the location of the network node 202. The GPS receiver circuitry 214 provides the decoded GPS location information to the controller 210. As such, the GPS receiver circuitry 214 is coupled to the controller 210 via an electrical connection 236. The controller 210 uses the decoded GPS location information in accordance with the function(s) of the SUN 102.

Figure 3:
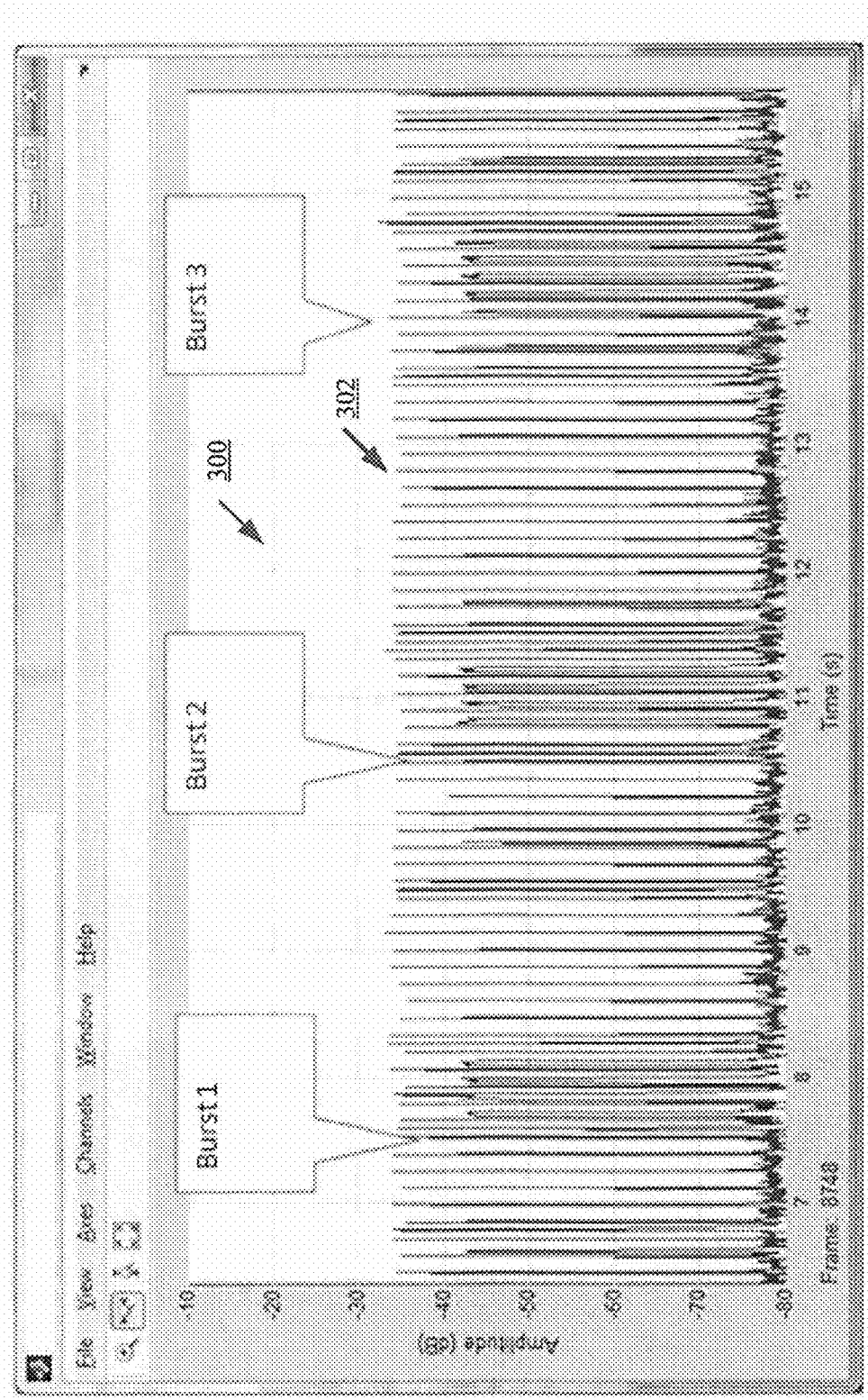
FIG. 3 is a graph illustrating an exemplary RF energy pattern of a protocol layer operation.

The controller 210 stores the decoded RF signal information and the decoded GPS location information in a memory 212 of the SUN 102. Accordingly, the memory 212 is connected to and accessible by the controller 210 through an electrical connection 232. The memory 212 can be a volatile memory and/or a non-volatile memory. For example, the memory 212 can include, but is not limited to, a Random Access Memory ("RAM"), a Dynamic Random Access Memory ("DRAM"), a Static Random Access Memory ("SRAM"), a Read-Only Memory ("ROM"), a disk drive, a flash memory, and/or any combination thereof. The memory 212 can also have stored therein sensed spectral data 262, sensed traffic RF energy pattern data 264, known protocol layer pattern data 292, learned protocol layer pattern data 298, and instructions 250. The sensed spectral data 262 includes, but is not limited to, data concerning sensed spectrum transmissions such as (1) data indicating during which of a plurality of slot sample times each physical data transfer was detected by a respective one of the SUNs and (2) data indicating at which of a plurality of licensed frequencies each physical data transfer occurred. The sensed spectral data 262 can also include packet information, such as an IP address and a packet type. The sensed traffic RF energy pattern data 264 includes, but is not limited to, data specifying RF energy patterns of physical data transfer operations being performed in a network. Data 264 can be derived at least partially from the sensed spectral data 262. The known protocol layer pattern data 292 includes, but is not limited to, data specifying pre-determined RF energy patterns of protocol layer operations. The learned protocol layer pattern data 298 includes, but is not limited to, data specifying learned RF energy patterns of protocol layer operations. An exemplary RF energy pattern of a protocol layer operation is shown in FIG. 3. More specifically, the RF energy pattern 300 of FIG. 3 is an RF energy pattern of an Internet Control Message Protocol ("ICMP") operation.

The instructions 250 can also reside, completely or at least partially, within the controller 210 during execution thereof by the SUN 102. In this regard, the memory 212 and the controller 210 can constitute machine-readable media. The term "machine-readable media", as used here, refers to a single medium or multiple media that store the one or more sets of instructions 250. The term "machine-readable media", as used here, also refers to any medium that is capable of storing, encoding or carrying the set of instructions 250 for execution by the SUN 102 and that cause the SUN 102 to perform one or more of the methodologies of the present disclosure.

The controller 210 is also connected to a user interface 230. The user interface 230 is comprised of input devices (not shown), output devices (not shown), and software routines (not shown) configured to allow a user to interact with and control software applications (not shown) installed on SUN 102. Such input and output devices can respectively include, but are not limited to, a display, a speaker, a keypad, a directional pad, a directional knob, a microphone, and a PTT button. Each of the listed input and output devices is well known in the art, and therefore will not be described herein.

As shown in FIG. 2, SUN 102 further comprises a processing device 212. The processing device 212 comprises an Environment Observation Component ("EOC") 260 and a cognitive engine 276. The EOC 260 performs spectral sensing operations. In this regard, the EOC 260 employs spectral sensing algorithms 266. The spectral sensing algorithms 266 are generally operative to cause the SUN 102 to sense or detect unused spectrum.

The EOC 260 also employs packet processing algorithms 268. The packet processing algorithms 268 are generally operative to extract protocol header information from unencrypted packets and/or unencrypted packet information contained in reports received from other SUNs. In some scenarios, the unencrypted packets can be obtained by performing ping tests to neighbor nodes using spectrum in a traffic network (e.g., encrypted traffic network 150 or clear traffic network 160 of FIG. 1) for upper-layer (e.g., IP layer) traffic transmissions. Ping tests are known in the art, and therefore will not be described herein. Still, it should be understood that the ping tests generally involve: broadcasting a ping message from the SUN 102; receiving response messages to the ping message from a plurality of PUNs (e.g., PUNS 110-122 of FIG. 1); and parsing the response messages to obtain protocol header information (e.g., a MAC layer header and/or an IP layer header) contained therein. Packet headers are well known in the art, and therefore will not be described herein. If a plurality of sensed spectrum transmissions cannot have the protocol headers (e.g., a MAC header and/or an IP header) detected, then this is an indication of encrypted traffic. If it persists, it is an indication of significant encrypted traffic.

If the sensing SUNs (e.g., SUNs 102-108 of FIG. 1) can communicate their traffic analysis to each other, then a path from an encrypted source device (e.g., PUN 110 of FIG. 1) to a destination device (e.g., PUN 112 of FIG. 1) emerges, as well as one or more RF energy patterns of upper-layer operations within the corresponding network (e.g., network 150 of FIG. 1). Therefore, SUN 102 is configured to broadcast its reports at certain times, as described below. The SUN 102 is also configured to receive reports broadcast from other SUNs (e.g., SUNs 104-108 of FIG. 1).

In unencrypted data scenarios, the reports can include packet information obtained by the other SUNs during their spectrum sensing operations. The SUN 102 may also process this packet information to obtain protocol header information therefrom. The protocol header information is then used by SUN 102 to identify a protocol layer operation which is being performed by the PUNs (e.g., PUNs 118-122 of FIG. 1). The identified protocol layer operation is then used to obtain a known or learned RF energy pattern therefore. The known or learned RF energy pattern is then used by SUN 102 for DSA/DSM purposes. More specifically, SUN 102 uses the RF energy patterns to find "holes" or "white spaces" (i.e., underutilized portions of a spectrum) that occur in a spectrum which have no upper-layer users. For example, SUN 102 finds a frequency $f_i$ (e.g., frequency $f_1$, $f_2$, $f_3$, $f_4$ of FIG. 1) at some time $t_i$ which is greater than a threshold value for an upper-layer use.

In encrypted data scenarios, SUN 102 is unable to use protocol header information as described above. As such, SUN 102 uses other information to identify a protocol layer operation which is being performed by the PUNs (e.g., PUNs 118-122 of FIG. 1). The other information includes, but is not limited to, sensed spectral data, signal length and/or a sensed traffic RF energy pattern. For example, if the sensed traffic RF energy pattern for a particular frequency $f_i$ indicates packet traffic according to some upper protocol layer operation and the physical layer sensing alone would indicate a spectrum share opportunity, then the SUN 102 performs validation operations to ensure that the spectrum share opportunity really does exist.

The validation operations involve determining that no known upper protocol layer packets are likely to collide during at least one particular spectrum "hole" or "white space". Such a determination can be made by performing operations in accordance with one or more validation algorithms 270. In this regard, at least one of the validation algorithms 270 involves comparing sensed traffic RF energy pattern data 264 to known or learned protocol layer pattern data 292, 298. The results of such a comparison can indicate which type of upper layer protocol operation(s) is (are) being performed by PUNs in a network. For example, the comparison results can indicate that ICMP operations are being performed. Based on this knowledge, the processing device 212 can conclude with a relatively high degree of certainty that no known upper layer protocol packets are likely to collide during at least one particular spectrum "hole" or "white space" (e.g., spectrum "hole" 302 of FIG. 3).

The cognitive engine 276 is generally configured to learn RF energy patterns of upper-layer operations with a network (e.g., network 150 and/or 160 of FIG. 1). In this regard, the cognitive engine 276 comprises a signal pattern generator 220 configured to determine learned protocol layer RF energy patterns from sensed spectral data 262 and/or sensed protocol layer pattern data 264. The learned protocol layer RF energy patterns are then stored in memory 212 as data 298.

The processing device 212 further comprises a node configuration engine 294 and a pattern comparator 222. The node configuration engine 294 is generally operative to configure and re-configure parameters of the SUN 102, such as one or more transceiver parameters in accordance with results from DSA/DSM operations. The transceiver parameters include, but are not limited to, a waveform parameter, a protocol parameter, an operating frequency parameter, and a networking parameter.

EXAMPLE 1

The following EXAMPLE 1 is provided to assist a reader in understanding the operations performed by the SUNs in accordance with the present invention when the transmissions include unencrypted traffic. The present invention is not limited to the particularities of this example.

In this example, each SUN 102-108 performs various DSA/DSM operations using knowledge at the physical layer of the protocol stack. More specifically, each SUN 102-108 broadcasts a report at the end of an epoch. The epoch is considered here as comprising the plurality of slot sample times (e.g., slot sample times t1-t15 of FIG. 4) with a plurality of slot report times (e.g., slot report times t16-t19 of FIG. 4).

Each of the SUNs 102-108 performs spectrum sensing operations during the slot sample times t1-t15. At the end of the slot sample time t15, a first SUN 102 uses a relatively small amount of available bandwidth in a freely available spectrum (e.g., the ISM band of 900 MHz, 2.4 GHz, and/or 5.8 GHz) to broadcast it's report. This broadcast is performed during slot report time t16. During a second slot report time t17, a second SUN 104 uses a relatively small amount of available bandwidth in the freely available spectrum (e.g., the ISM band of 900 MHz, 2.4 GHz, and/or 5.8 GHz) to broadcast its report. Similarly, a third SUN 106 broadcasts its report during slot report time t18, and so on. Notably, SUN 102 does receive the broadcasts from SUN 104 and 106, but does not receive the broadcast from SUN 108.

Notably, each report comprises sensed spectral data indicating (1) during which of the slot sample times each physical data transfer was detected by a respective one of the first and second SUNs, and (2) at which of the first licensed frequencies each physical data transfer occurred. A schematic illustration of such sensed spectral data is shown in FIG. 4. The report may also comprise unencrypted packet information extracted from packets transferred by the PUNs at one or more licensed frequencies during the particular epoch.

In the unencrypted case, SUN 102 extracts certain protocol header information (e.g., the IP addresses of PUNs) from the unencrypted packets received thereat and from the unencrypted packet information contained in reports received from two or more SUNs 104-108. The protocol header information is obtained from packets transmitted by the PUNs at frequencies $f_3$ and $f_4$ in slot sample times t4, t5, t7, t13 and/or t15 of a first epoch. For example, SUN 102 extracts the IP addresses of PUNs from transmissions sensed by itself at frequencies $f_3$ and $f_4$ in slot sample times t4, t7, t13 and/or t15 of a first epoch. SUN 102 also extracts the IP addresses from packet header information contained in a report received from SUN 104 and associated with packets transmitted by PUNs at frequencies $f_3$ and $f_4$ in slot sample times t5, t7, t13 and/or t15 of a first epoch. In this case, the protocol header information indicates that the PUNs 120 and 122 are probably communicating with each other in accordance with a particular network protocol operation (e.g., an IP layer network packet transfer operation) with a 50% confidence level. If this analysis is performed using the protocol header information of unencrypted packets transmitted from PUNs 102-106, SUN 102 would have a 75% confidence level that the PUNs 120 and 122 are probably communicating with each other in accordance with the particular network protocol operations.

Thereafter, SUN 102 repeats the above protocol header extraction and analysis process using transmission data sensed by the SUNs 102-108 during a second epoch. In this case, SUN 102 receives the second epoch report broadcast from other SUNs. Notably, at least one of the second epoch reports includes information for transmissions sensed by SUN 108. As such, SUN 102 can obtain a much better idea of which PUNs are sending what when. For example, the transmission information obtained by SUN 108 confirms that PUNs 118-122 are actually communicating in the manner reported by SUNs 102, 104 and 106 (e.g., in accordance with an IP layer network packet transfer operation). Consequently, SUN 102 now has a 90% confidence level that the PUNs 120 and 122 are communicating with each other in accordance with the particular network protocol operation(s).

At the end of each epoch, SUN 102 obtains a known RF energy pattern of the particular network protocol operation (e.g., an IP layer network packet transfer operation). The known RF energy pattern is used by SUN 102 to determine if it is a good time to be provided access to the licensed segment of the wireless spectrum (e.g., licensed frequencies $f_3$ and $f_4$). Once this determination is made, SUN 102 changes its transceiver parameters accordingly. The transceiver parameters include, but are not limited to, a waveform parameter, a protocol parameter, an operating frequency parameter, and a networking parameter.

A stealth option exists in the unencrypted scenarios. For example, if the transmissions include unencrypted packets, then the IP addresses can be obtained relatively quickly via ping and trace route operations. Ping and trace route operations are standard IP level tools within a protocol to find out which devices exist along a path over which a transmission traveled from a source device to a destination device. Therefore, in some scenarios, the IP address information can be obtained in this alternative manner.

Notably, the above described manner in which the SUNs coordinate sensed spectrum information is distinguishable from conventional techniques for doing the same. The conventional techniques generally involve: reporting by a plurality of SUNs sensed spectrum information using a rendezvous channel; processing the reported sensed spectrum information by a centralized logic to determine the total number of SUNs which reported an availability of each particular frequency (e.g., frequency $f_3$ of FIG. 1); and sending a command from the centralized logic to all of the SUNs to begin using the frequency which was reported as being available by the largest number of SUNs. Despite the advantages of this conventional technique, it suffers from certain drawbacks. For example, if an enemy knows the rendezvous channel, then the enemy can jam the rendezvous channel so as to make the system 100 inoperable. This drawback does not exist in the present invention since a time related coordination technique is employed. The time related coordination technique involves the novel step of reporting sensed spectral data from a plurality of other SUNs on a time division basis (i.e., at the end of each epoch).

The present invention also includes the novel step of using physical layer information in conjunction with upper-layer information to determine when SUNs can communicate with their peers using a licensed spectrum. This is an important feature of the present invention because it provides a way to ensure with a greater certainty (as compared to that of conventional DSA/DSM systems) that no interference or only a minimal amount of interference could occur as a result of SUN utilization of a licensed spectrum.

In some unencrypted scenarios and all encrypted scenarios, the above process would involve using physical layer information as well as detected signal length and RF energy pattern information for purposes of determining which protocol layer operations are being performed by PUNs. The following EXAMPLE 2 is provided to illustrate the particularities of an exemplary encrypted scenario. The present invention is not limited to the particularities of EXAMPLE 2.

EXAMPLE 2

In this example, each SUN 102-108 performs various DSA/DSM operations using sensed data at the physical layer of the protocol stack, as well as at least one upper-layer of the protocol stack (e.g., the MAC layer and/or the IP layer). More specifically, each SUN 102-106 senses spectrum in a given licensed frequency band during a first epoch. For example, the SUNs: sense encrypted transmissions at frequencies $f_1$ and $f_2$ in slot sample times t1, t3, t6, t8, t9, t10, t11, t12 and/or t14 of the first epoch; encrypted and unencrypted transmissions at respective frequencies $f_2$ and $f_3$ in slot sample times t4 and t5; and two different encrypted transmissions at respective frequencies $f_1$ and $f_2$ in slot sample time t2. Notably, the SUNs 102-106 are unable to decode the encrypted transmissions sensed thereby at frequencies $f_1$ and $f_2$. Still, the reports indicate that there is a disagreement as to which frequency $f_1$ or $f_2$ the PUNs 110-114 are using during slot sample time t2 of the first epoch. This disagreement indicates that there may be an opportunity for the SUNs to use frequency $f_1$ or $f_2$ at an identified time. As such, the sensed information for slot sample time t2 of the first epoch is saved for subsequent use to generate an RF energy pattern of upper-layer operations.

During a second epoch, the report of SUN 108 is provided to SUN 102. In this case, the encrypted transmissions still cannot be decoded by the SUNs. However, the reports of SUNs 102 and 108 indicate that there is a disagreement as to which frequency $f_1$ or $f_2$ the PUNs 110-114 are using during slot sample time t7 of the second epoch. This disagreement indicates that there may be an opportunity for the SUNs to use frequency $f_1$ or $f_2$ at an identified time. As such, the sensed information for slot sample time t2 of the first epoch is saved for subsequent use to generate an RF energy pattern of upper-layer operations.

During a third epoch, additional SUNs report sensed spectral data. These reports indicate that there is a disagreement as to which frequency $f_1$ or $f_2$ the PUNs 110-114 are using during slot sample times t6 and t12 of the third epoch. This disagreement indicates that there may be an opportunity for the SUNs to use frequency $f_1$ or $f_2$ at the identified times. As such, the sensed information for slot sample times t6 and t12 of the third epoch is saved for subsequent use to generate an RF energy pattern of upper-layer operations.

The above-specified stored sensed information is then processed by at least one SUN to create an RF energy pattern of upper-layer operations. Next, the pattern of upper-layer operations is compared to at least one known or learned reference RF energy pattern of upper-layer operations. If a match exists between the compared RF energy patterns of upper-layer operations, then information is stored indicating such a match. Also, the RF energy pattern(s) of upper-layer operations is (are) used to identify (with a relatively high degree of certainty) times when the SUNs can use at least one frequency $f_1$ or $f_2$ without interfering with or only minimally interfering with communications of the PUNs.

As evident from the above examples, the key to the DSA/DSM technique of the present invention is to: use the collection of sensing SUNs as a cooperative cognitive analysis tool to compare packet traffic (or anything above the physical layer) with signal detection; and estimate a probability of a signal within an opportunity window based on results of such comparison operations. To do this, packets such as that shown in the next EXAMPLE 3 can give time estimates of transfers because some upper-layer protocol will work in a predictable RF energy pattern.

EXAMPLE 3

Figure 5:
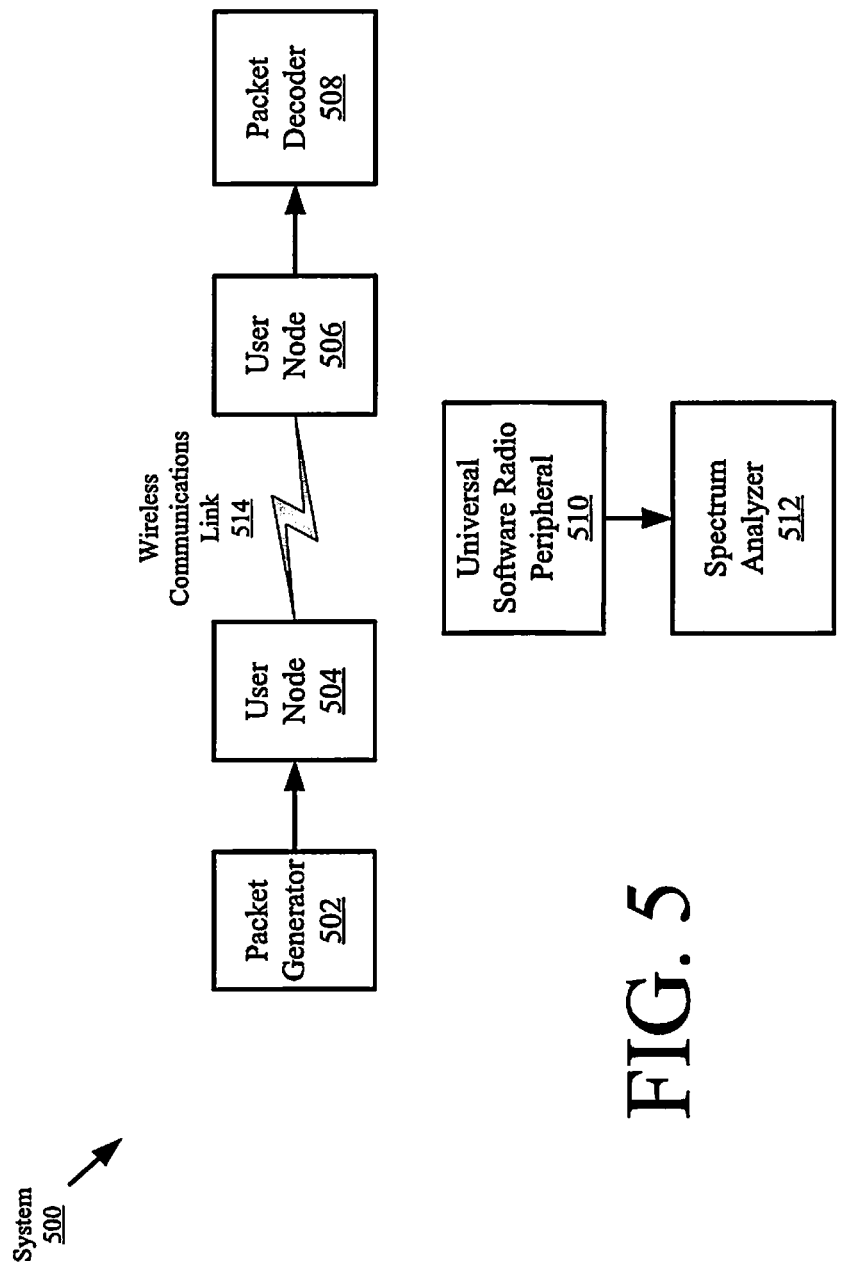
FIG. 5 is schematic illustration of an exemplary system that is useful for understanding the present invention.
Figure 6A:
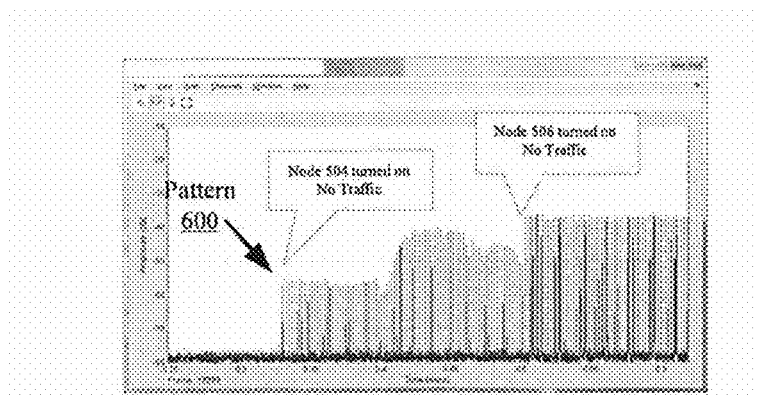
FIGS. 6A-6C provide graphs illustrating RF energy patterns for particular upper-layer protocol data transfers performed by user nodes of the system shown in FIG. 5 during operation thereof.
Figure 6B:
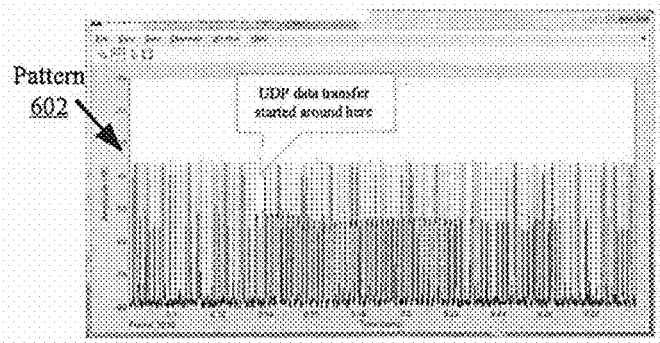
Figure 6C:
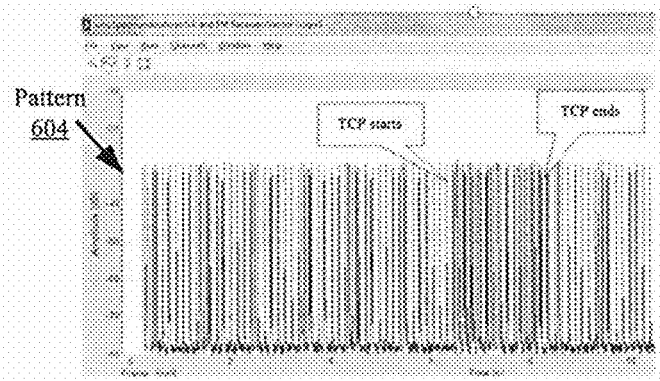

In this example, laboratory analysis results are discussed in relation to FIGS. 5-6C. FIG. 5 provides a schematic illustration of an exemplary system 500. System 500 comprises a packet generator 502, user nodes 504, 506, and a packet decoder 508. The user nodes 504, 506 may include, but are not limited to, tactical radios running a waveform. For example, each user node 504, 506 is running an Adaptive Network Wideband Waveform ("ANW2").

During operation, packets are generated at the packet generator 502 which include encrypted information. The packets are then communicated from the packet generator 502 to user node 504. In turn, user node 504 forwards the packets to packet decoder 508 via a wireless communications link 514 and user node 506. The packet decoder 508 decodes the packets using packet decoding software installed thereon (e.g., WIRESHARK® software available from the Wireshark Foundation). The decoded packets are then used to provide a display of the traffic being communicated between the user nodes 504, 506.

System 500 also comprises a spectrum analyzer 512 residing between the user nodes 504, 506. In one scenario, the spectrum analyzer 512 is built using a simulation software program (e.g., MATLAB® available from MathWorks®, Inc.). The spectrum analyzer 512 is communicatively coupled to a Universal Software Radio Peripheral ("USRP") 510. The USRP 510 is a programmable wireless communication device which has been programmed to act as a DSA capture machine. As such, the USRP 510 performs spectral sensing operations for detecting transmissions between user nodes 504, 506. The sensed transmission data can be analyzed to identify RF energy patterns of upper-layer operations performed by the user nodes 504, 506. Schematic illustrations of examples of such RF energy patterns are provided in FIG. 3 and FIGS. 6A-6C. The graph of FIG. 3 illustrates that ICMP data transfers have a particular RF energy pattern 300. The graph of FIG. 6A illustrates that user nodes 504, 506 create a unique RF energy pattern 600 when they are turned on (i.e., even before voice and data transmissions occur). The graph of FIG. 6B illustrates that User Datagram Protocol ("UDP") data transfers have a unique RF energy pattern 602. The graph of FIG. 6C illustrates that Transmission Control Protocol ("TCP") data transfers have a unique RF energy pattern 604.

The unique RF energy patterns detected during the laboratory analysis can be used as a baseline of knowledge for a network employing a DSA/DSM method of the present invention (such as method 700 described below). In this regard, data specifying the unique RF energy patterns 600-604 can be stored in one or more SUNs (e.g., SUNs 102-108 of FIG. 1) as known RF energy patterns of upper-layer operations (e.g., data 292 of FIG. 2).

As described above, known RF energy patterns can be used by SUNs (e.g., SUNs 102-108 of FIG. 1) to identify (with a relatively high degree of certainty) times when they can use a particular licensed frequency (e.g., frequency $f_1$, $f_2$, $f_3$ or $f_4$ of FIG. 1) without or only minimally interfering with use thereof by the PUNs (e.g., PUNs 110-122 of FIG. 1). Notably, the SUNs do not need to know which upper-layer operation corresponds to which RF energy pattern. All the SUNs need to know is that certain detected times of spectrum "holes" or "white spaces" can be eliminated as possible times for the SUNs to use licensed spectrum based on a given known RF energy pattern of operation. For example, consider the scenario where a plurality of SUNs detect the same "hole" or "white space" in a licensed spectrum, and therefore agree that it is now a good time for them to use the licensed spectrum. However, in reality, this may not be a good time to use the licensed spectrum because a particular RF energy pattern of upper-layer operations indicates that by the time the SUNs coordinate their transceiver operations a PUN will send its second part of its N part traffic pattern. Accordingly, the "hole" or "white space" detected by the SUNs is eliminated as a possible time to use the licensed spectrum.

Referring now to FIG. 7, there is provided an exemplary method 700 for dynamically managing SUN access to a segment of a wireless spectrum licensed for use by PUNs (e.g., PUNs 110-122 of FIG. 1), in accordance with the present invention. As shown in FIG. 7, method 700 begins with step 702 and continues with step 704. In step 704, operations are performed by at least a first SUN (e.g., SUN 102 of FIG. 1) to obtain first data specifying at least one RF energy pattern of an upper protocol layer operation. Operations are also performed by the first SUN to store the first data in a data store for later use in subsequent DSA operations, as shown by step 706. The first data can be obtained from an external source. In this case, the first data is stored in a memory of the first SUN (e.g., memory 212 of FIG. 2) as known protocol layer pattern data (e.g., known protocol layer pattern data 292 of FIG. 2). Alternatively, the first data can be learned by the first SUN during operations thereof. In this case, the first data is stored in the memory thereof as learned protocol layer pattern data (e.g., learned protocol layer pattern data 298 of FIG. 2).

In a next step 708, at least the first SUN and a second SUN (e.g., SUN 104 of FIG. 1) detects physical data transfers by the PUNs at a plurality of first licensed frequencies (e.g., $f_1$, $f_2$, $f_3$, $f_4$ of FIG. 1) during a plurality of slot sample times of a first epoch. Thereafter, in step 710, each of the first and second SUNs generates a report. The report can include, but is not limited to: (a) sensed spectral data indicating during which of the slot sample times each physical data transfer was detected by a respective one of the first and second SUNs; (b) sensed spectral data indicating at which of the first licensed frequencies each physical data transfer occurred; and/or (c) unencrypted packet information obtained from packets transferred by the PUNs at one or more of the first licensed frequencies during at least some of the plurality of slot sample times of the first epoch.

In step 712, the respective report is broadcast from the second SUN at a non-licensed frequency during a respective one of a plurality of slot report times (e.g., slot report times t16-t19 of FIG. 4). The broadcasted report is received by the first SUN, as shown by step 714. At the first SUN, the information contained in the reports is analyzed to obtain a known or learned RF energy pattern for a protocol layer operation, as shown by step 716.

In an unencrypted data scenario, the analysis of step 716 involves: extracting protocol header information from a plurality of unencrypted packets transferred by the PUNs at at least one of the first licensed frequencies during at least some of the plurality of slot sample times (e.g., slot sample times t4, t5, t7, t13, t15 of FIG. 5); extracting packet header information from unencrypted packet information contained in reports generated a plurality of SUNs; and using the protocol header information to identify at least one protocol layer operation which is probably being performed by the PUNs; and obtaining the know or learned RF energy pattern for the identified protocol layer operation.

In the encrypted data scenarios, the analysis of step 716 involves: determining a traffic RF energy pattern at a licensed frequency of the plurality of licensed frequencies; comparing the traffic RF energy pattern to a plurality of known or learned RF energy patterns for various protocol layer operations; and selecting the known or learned RF energy pattern which entirely or at least partially matches the traffic RF energy pattern for later use in a next step 718.

Step 718 involves analyzing the information contained in the reports and/or the selected known or learned RF energy pattern to determine a time for using a first licensed frequency without interfering with or only minimally interfering with use thereby by the PUNs. Steps 708-718 are then repeated for a plurality of epochs subsequent to the first epoch, as shown by step 720. Thereafter, step 722 is performed where method 700 ends or other processing is performed.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for dynamically managing Secondary User Node ("SUN") access to a segment of a wireless spectrum licensed for use by Primary User Nodes ("PUNs"), the method comprising:

detecting, by first and second SUNs, physical data transfers by the PUNs at a plurality of first licensed frequencies during a plurality of slot sample times of a first epoch;

generating, by each of the first and second SUNs, a report comprising sensed spectral data indicating
  (1) during which of the slot sample times each physical data transfer was detected by a respective one of the first and second SUNs, and
  (2) at which of the first licensed frequencies each physical data transfer occurred;

receiving, by the first SUN, the report broadcasted from the second SUN at a non-licensed frequency during a respective one of a plurality of slot report times following the slot sample times of the first epoch;

analyzing, by at least the first SUN, the sensed spectral data of the reports to obtain a known or learned RF energy pattern of upper-layer operations capable of being performed by the PUNs; and using the known or learned RF energy pattern to determine a time for using a first licensed frequency without interfering with or only minimally interfering with use thereof by the PUNs.

2. The method according to claim 1, further comprising repeating the detecting, generating, receiving and analyzing during each of a plurality of epochs subsequent to the first epoch.

3. The method according to claim 1, further comprising determining a traffic RF energy pattern at a licensed frequency of the plurality of licensed frequencies.

4. The method according to claim 3, further comprising comparing the traffic RF energy pattern to a plurality of known or learned RF energy patterns for various protocol layer operations.

5. A method for dynamically managing Secondary User Node ("SUN") access to a segment of a wireless spectrum licensed for use by Primary User Nodes ("PUNs"), the method comprising:
   detecting, by first and second SUNs, physical data transfers by the PUNs at a plurality of first licensed frequencies during a plurality of slot sample times of a first epoch;
   generating, by each of the first and second SUNs, a report comprising sensed spectral data indicating
      (1) during which of the slot sample times each physical data transfer was detected by a respective one of the first and second SUNs, and
      (2) at which of the first licensed frequencies each physical data transfer occurred;
   receiving, by the first SUN, the report broadcasted from the second SUN at a non-licensed frequency during a respective one of a plurality of slot report times following the slot sample times of the first epoch; and
   analyzing, by at least the first SUN, the sensed spectral data of the reports to determine a time for using a first licensed frequency without interfering with or only minimally interfering with use thereof by the PUNs;
   wherein the report generated by at least one of the first and second SUNs further comprises unencrypted packet information transferred by the PUNs at at least one of the first licensed frequencies during at least some of the plurality of slot sample times of the first epoch.

6. A method for dynamically managing Secondary User Node ("SUN") access to a segment of a wireless spectrum licensed for use by Primary User Nodes ("PUNs"), the method comprising:
   detecting, by first and second SUNs, physical data transfers by the PUNs at a plurality of first licensed frequencies during a plurality of slot sample times of a first epoch;
   generating, by each of the first and second SUNs, a report comprising sensed spectral data indicating
      (1) during which of the slot sample times each physical data transfer was detected by a respective one of the first and second SUNs, and
      (2) at which of the first licensed frequencies each physical data transfer occurred;
   receiving, by the first SUN, the report broadcasted from the second SUN at a non-licensed frequency during a respective one of a plurality of slot report times following the slot sample times of the first epoch;
   analyzing, by at least the first SUN, the sensed spectral data of the reports to determine a time for using a first licensed frequency without interfering with or only minimally interfering with use thereof by the PUNs;
   extracting protocol header information from a plurality of unencrypted packets transferred by the PUNs at at least one of the first licensed frequencies during at least some of the plurality of slot sample times of the first epoch; and
   using the protocol header information to identify at least one protocol layer operation which is probably being performed by the PUNs.

7. The method according to claim 6, further comprising obtaining a known or learned RF energy pattern for the protocol layer operation which was previously identified.

8. The method according to claim 7, wherein the known or learned RF energy pattern is also analyzed to determine a time for using a first licensed frequency without interfering with or only minimally interfering with use thereof by the PUNs.

9. A method for dynamically managing Secondary User Node ("SUN") access to a segment of a wireless spectrum licensed for use by Primary User Nodes ("PUNs"), the method comprising:
   detecting, by first and second SUNs, physical data transfers by the PUNs at a plurality of first licensed frequencies during a plurality of slot sample times of a first epoch;
   generating, by each of the first and second SUNs, a report comprising sensed spectral data indicating
      (1) during which of the slot sample times each physical data transfer was detected by a respective one of the first and second SUNs, and
      (2) at which of the first licensed frequencies each physical data transfer occurred;
   receiving, by the first SUN, the report broadcasted from the second SUN at a non-licensed frequency during a respective one of a plurality of slot report times following the slot sample times of the first epoch;
   analyzing, by at least the first SUN, the sensed spectral data of the reports to determine a time for using a first licensed frequency without interfering with or only minimally interfering with use thereof by the PUNs;
   determining a traffic RF energy pattern at a licensed frequency of the plurality of licensed frequencies;
   comparing the traffic RF energy pattern to a plurality of known or learned RF energy patterns for various protocol layer operations; and
   using the known or learned RF energy pattern that entirely or at least partially matches the traffic RF energy pattern to determine a time for using a first licensed frequency without interfering with or only minimally interfering with use thereof by the PUNs.

10. A system, comprising:
   at least one electronic circuit configured to perform the following operations:
      detect physical data transfers by a plurality of Primary User Nodes at a plurality of first licensed frequencies during a plurality of slot sample times of a first epoch;
      generate a first report comprising sensed spectral data indicating
         (1) during which of the slot sample times each physical data transfer was detected, and
         (2) at which of the first licensed frequencies each physical data transfer occurred;
      receive a second report broadcasted from a Secondary User Node ("SUN") at a non-licensed frequency during a respective one of a plurality of slot report times following the slot sample times of the first epoch;
      analyze the sensed spectral data of the first and second reports to obtain a known or learned RF energy pattern of upper-layer operations capable of being performed by the PUNS; and
      using the known or learned RF energy pattern to determine a time at which a plurality of SUNs should be allowed use of a first licensed frequency without interfering with or only minimally interfering with use thereof by the PUNS.

11. The system according to claim 10, wherein the electronic circuit is further configured to repeat the detect, generate, receive and analyze operations during each of a plurality of epochs subsequent to the first epoch.

12. The system according to claim 10, wherein the electronic circuit is further configured to determine a traffic RF energy pattern at a licensed frequency of the plurality of licensed frequencies.

13. The system according to claim 12, wherein the electronic circuit is further configured to compare the traffic RF energy pattern to a plurality of known or learned RF energy patterns for various protocol layer operations.

14. A system, comprising:
at least one electronic circuit configured to perform the following operations:
detect physical data transfers by a plurality of Primary User Nodes at a plurality of first licensed frequencies during a plurality of slot sample times of a first epoch;
generate a first report comprising sensed spectral data indicating
(3) during which of the slot sample times each physical data transfer was detected, and
(4) at which of the first licensed frequencies each physical data transfer occurred;
receive a second report broadcasted from a Secondary User Node ("SUN") at a non-licensed frequency during a respective one of a plurality of slot report times following the slot sample times of the first epoch; and
analyze the sensed spectral data of the first and second reports to determine a time at which a plurality of SUNs should be allowed use of a first licensed frequency without interfering with or only minimally interfering with use thereof by the PUNs;
wherein the report generated by the SUN further comprises unencrypted packet information transferred by the PUNs at at least one of the first licensed frequencies during at least some of the plurality of slot sample times of the first epoch.

15. A system, comprising:
at least one electronic circuit configured to perform the following operations:
detect physical data transfers by a plurality of Primary User Nodes at a plurality of first licensed frequencies during a plurality of slot sample times of a first epoch;
generate a first report comprising sensed spectral data indicating
(5) during which of the slot sample times each physical data transfer was detected, and
(6) at which of the first licensed frequencies each physical data transfer occurred;
receive a second report broadcasted from a Secondary User Node ("SUN") at a non-licensed frequency during a respective one of a plurality of slot report times following the slot sample times of the first epoch; and
analyze the sensed spectral data of the first and second reports to determine a time at which a plurality of SUNs should be allowed use of a first licensed frequency without interfering with or only minimally interfering with use thereof by the PUNs;
wherein the electronic circuit is further configured to:
extract protocol header information from a plurality of unencrypted packets transferred by the PUNs at at least one of the first licensed frequencies during at least some of the plurality of slot sample times of the first epoch; and
use the protocol header information to identify at least one protocol layer operation which is probably being performed by the PUNs.

16. The system according to claim 15, wherein the electronic circuit is further configured to obtain a known or learned RF energy pattern for the protocol layer operation which was previously identified.

17. The system according to claim 16, wherein the known or learned RF energy pattern is also analyzed to determine a time for using a first licensed frequency without interfering with or only minimally interfering with use thereof by the PUNs.

18. A system, comprising:
at least one electronic circuit configured to perform the following operations:
detect physical data transfers by a plurality of Primary User Nodes at a plurality of first licensed frequencies during a plurality of slot sample times of a first epoch;
generate a first report comprising sensed spectral data indicating
(7) during which of the slot sample times each physical data transfer was detected, and
(8) at which of the first licensed frequencies each physical data transfer occurred;
receive a second report broadcasted from a Secondary User Node ("SUN") at a non-licensed frequency during a respective one of a plurality of slot report times following the slot sample times of the first epoch; and
analyze the sensed spectral data of the first and second reports to determine a time at which a plurality of SUNs should be allowed use of a first licensed frequency without interfering with or only minimally interfering with use thereof by the PUNs;
wherein the electronic circuit is further configured to determine a traffic RF energy pattern at a licensed frequency of the plurality of licensed frequencies;
wherein the electronic circuit is further configured to compare the traffic RF energy pattern to a plurality of known or learned RF energy patterns for various protocol layer operations; and
wherein the electronic circuit is further configured to use the known or learned RF energy pattern that entirely or at least partially matches the traffic RF energy pattern to determine a time for using a first licensed frequency without interfering with or only minimally interfering with use thereof by the PUNs.

* * * * *